United States Patent
Nakano et al.

(10) Patent No.: US 10,211,887 B2
(45) Date of Patent: Feb. 19, 2019

(54) RECEIVER AND COMMUNICATION SYSTEM

(71) Applicant: Sony Corporation, Tokyo (JP)

(72) Inventors: Hiroaki Nakano, Tokyo (JP); Uichiro Omae, Kanagawa (JP); Hiroaki Fujita, Kanagawa (JP); Masayoshi Abe, Tokyo (JP); Ken Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 14 days.

(21) Appl. No.: 15/543,711

(22) PCT Filed: Dec. 17, 2015

(86) PCT No.: PCT/JP2015/085315
§ 371 (c)(1),
(2) Date: Jul. 14, 2017

(87) PCT Pub. No.: WO2016/129177
PCT Pub. Date: Aug. 18, 2016

(65) Prior Publication Data
US 2017/0373726 A1 Dec. 28, 2017

(30) Foreign Application Priority Data

Feb. 10, 2015 (JP) .................................. 2015-024053

(51) Int. Cl.
*G06K 19/07* (2006.01)
*H04B 5/00* (2006.01)
(Continued)

(52) U.S. Cl.
CPC ........... *H04B 5/0062* (2013.01); *G06K 19/07* (2013.01); *G06K 19/0723* (2013.01); *H04B 1/59* (2013.01);
(Continued)

(58) Field of Classification Search
CPC .......... H04B 5/0062; H04B 1/59; H04B 5/02; G06K 19/07; G06K 19/0723; H04L 1/08; H04L 27/04
(Continued)

(56) References Cited

U.S. PATENT DOCUMENTS 7,671,983 B2 * 3/2010 Shammai ............... E21B 49/081
356/301
8,934,836 B2 * 1/2015 Lefley .................. H04B 5/0075
340/10.1

(Continued)

FOREIGN PATENT DOCUMENTS

JP 2011-254156 A 12/2011
JP 2013-062605 A 4/2013

*Primary Examiner* — Ali Neyzari
(74) *Attorney, Agent, or Firm* — Michael Best & Friedrich LLP

(57) ABSTRACT

A receiver of the disclosure includes: a load modulator that transmits an active load modulation signal generated by active load modulation to a reader writer, in response to a carrier signal transmitted from the reader writer; and a controller that determines whether the active load modulation signal has reached the reader writer, and controls the load modulator to retransmit the active load modulation signal, after changing a phase of the active load modulation signal with respect to the carrier signal, in a case where the controller determines that the active load modulation signal has not reached the reader writer.

9 Claims, 13 Drawing Sheets

(51) Int. Cl.
   *H04B 1/59* (2006.01)
   *H04B 5/02* (2006.01)
   *H04L 1/08* (2006.01)
   *H04L 27/04* (2006.01)

(52) U.S. Cl.
   CPC .............. *H04B 5/02* (2013.01); *H04L 1/08* (2013.01); *H04L 27/04* (2013.01)

(58) Field of Classification Search
   USPC .............................................. 340/10.4, 10.1
   See application file for complete search history.

(56) References Cited

U.S. PATENT DOCUMENTS

| | | | |
|---|---|---|---|
| 9,080,997 B2* | 7/2015 | Minvielle | G01N 33/02 |
| 9,331,748 B2* | 5/2016 | Bernard | G06K 19/0723 |
| 9,407,328 B2* | 8/2016 | Charrat | G06K 19/07769 |
| 2013/0288599 A1 | 10/2013 | Bernard et al. | |
| 2014/0003548 A1 | 1/2014 | Lefley | |
| 2014/0037805 A1 | 2/2014 | Minvielle | |
| 2014/0218176 A1 | 8/2014 | Thueringer et al. | |

\* cited by examiner

[ FIG. 1 ]
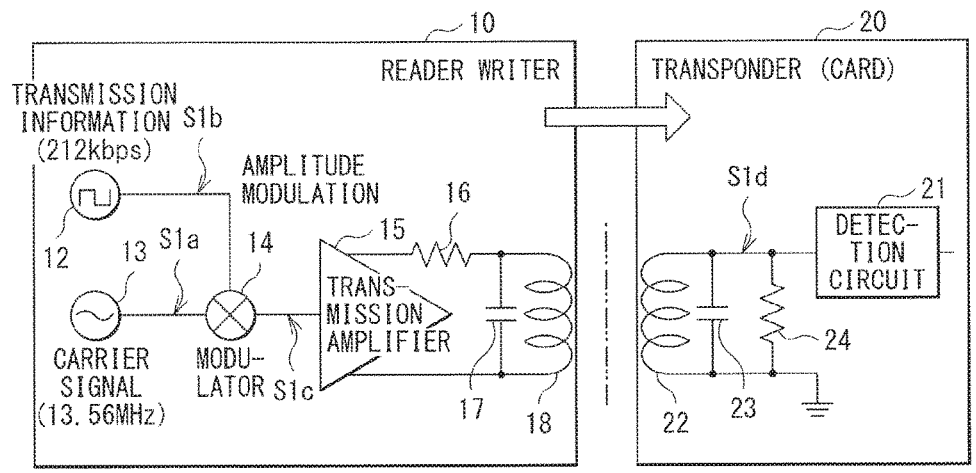
[ FIG. 2 ]
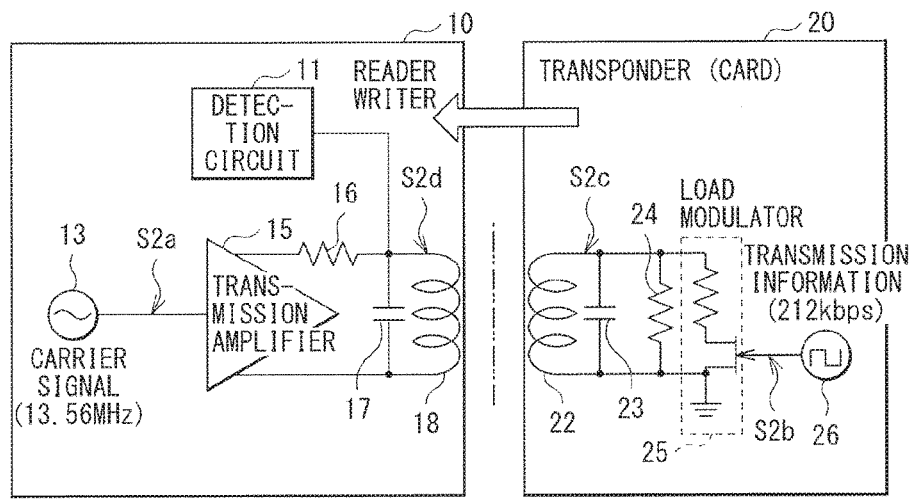

[FIG. 3]
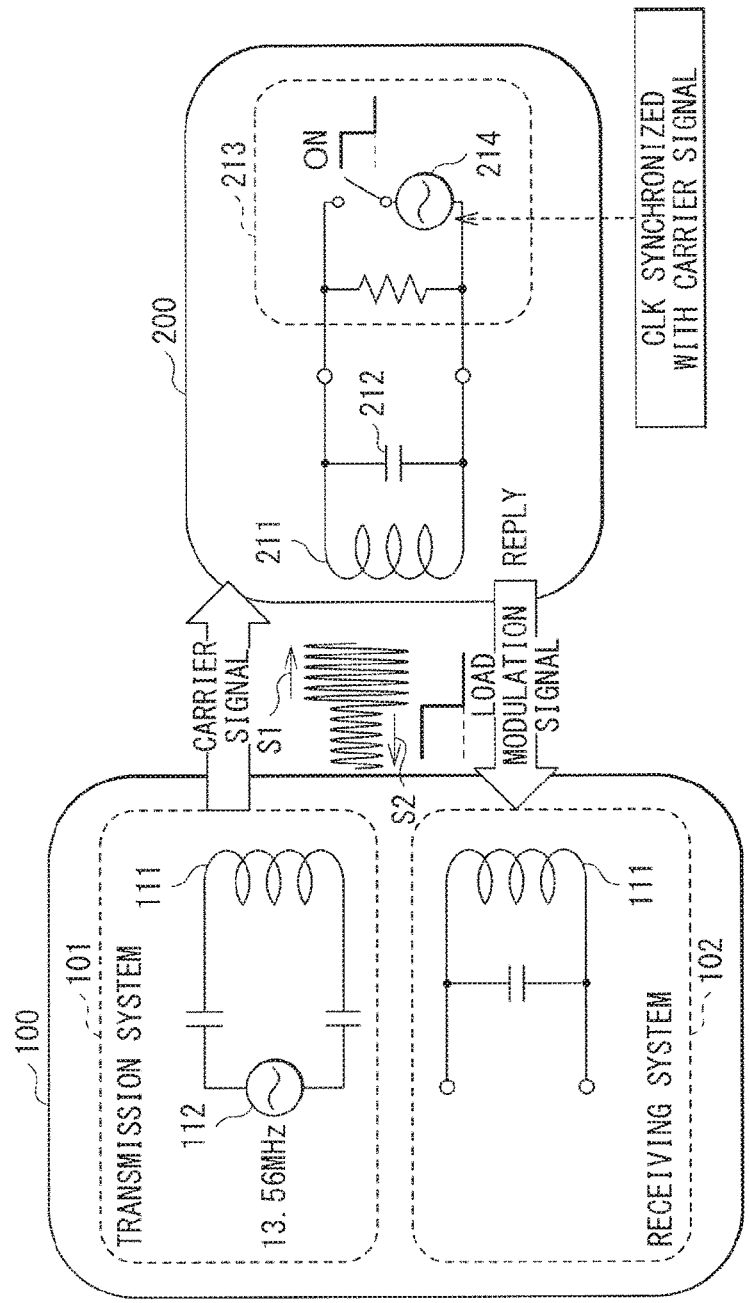

[ FIG. 4 ]
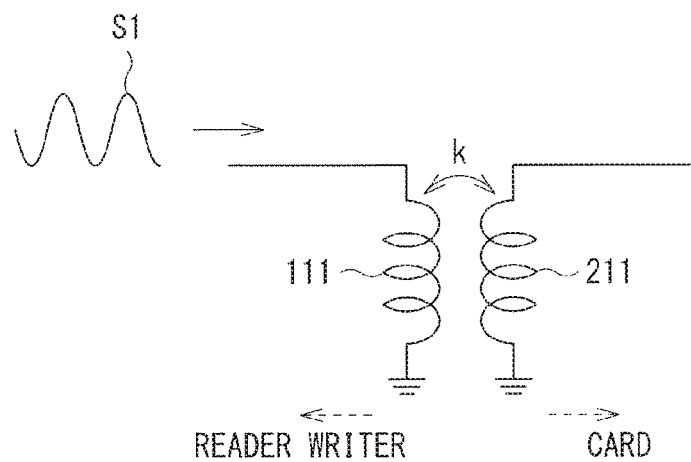
[ FIG. 5 ]
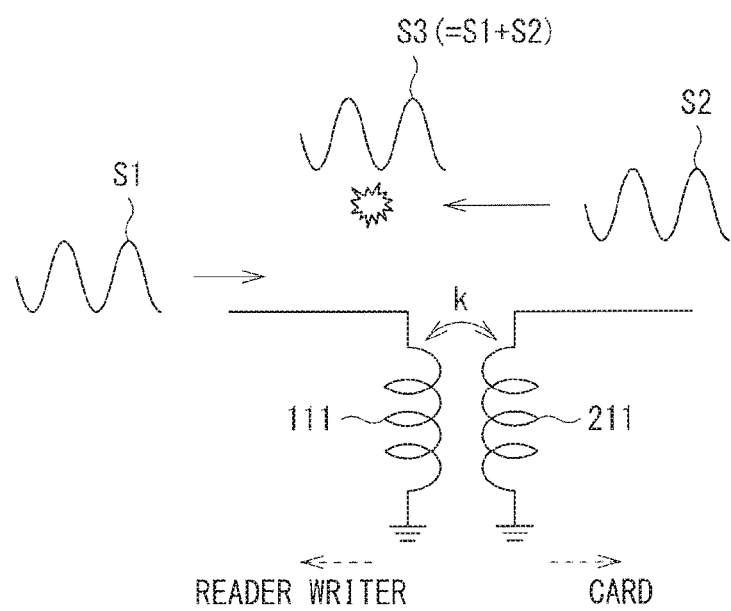

[FIG. 6]
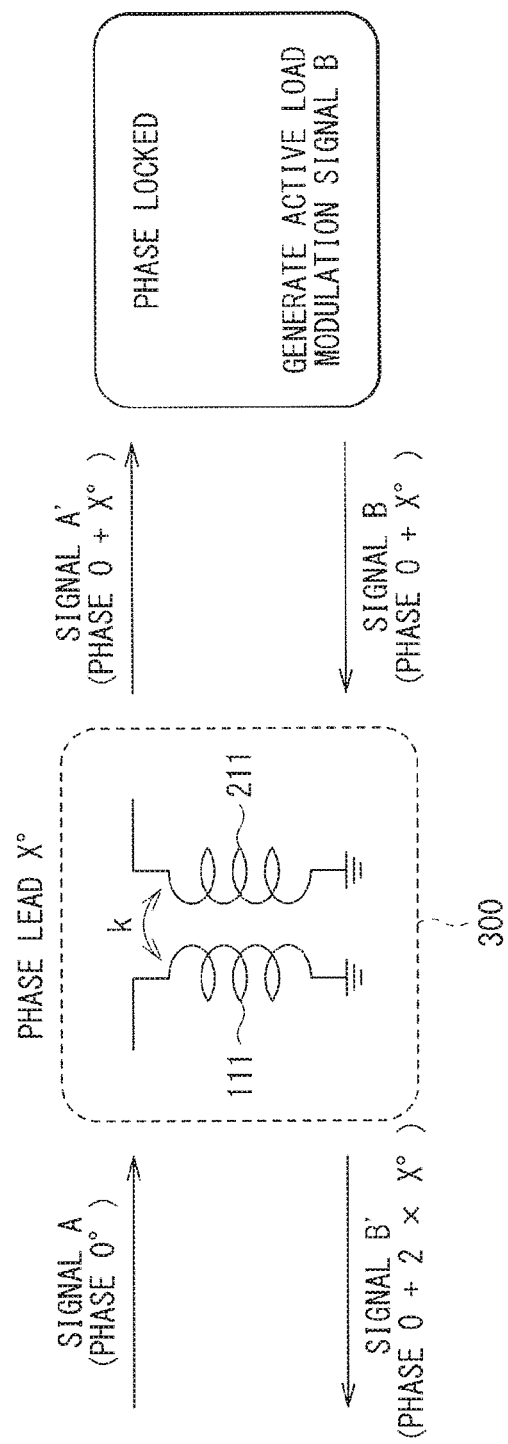

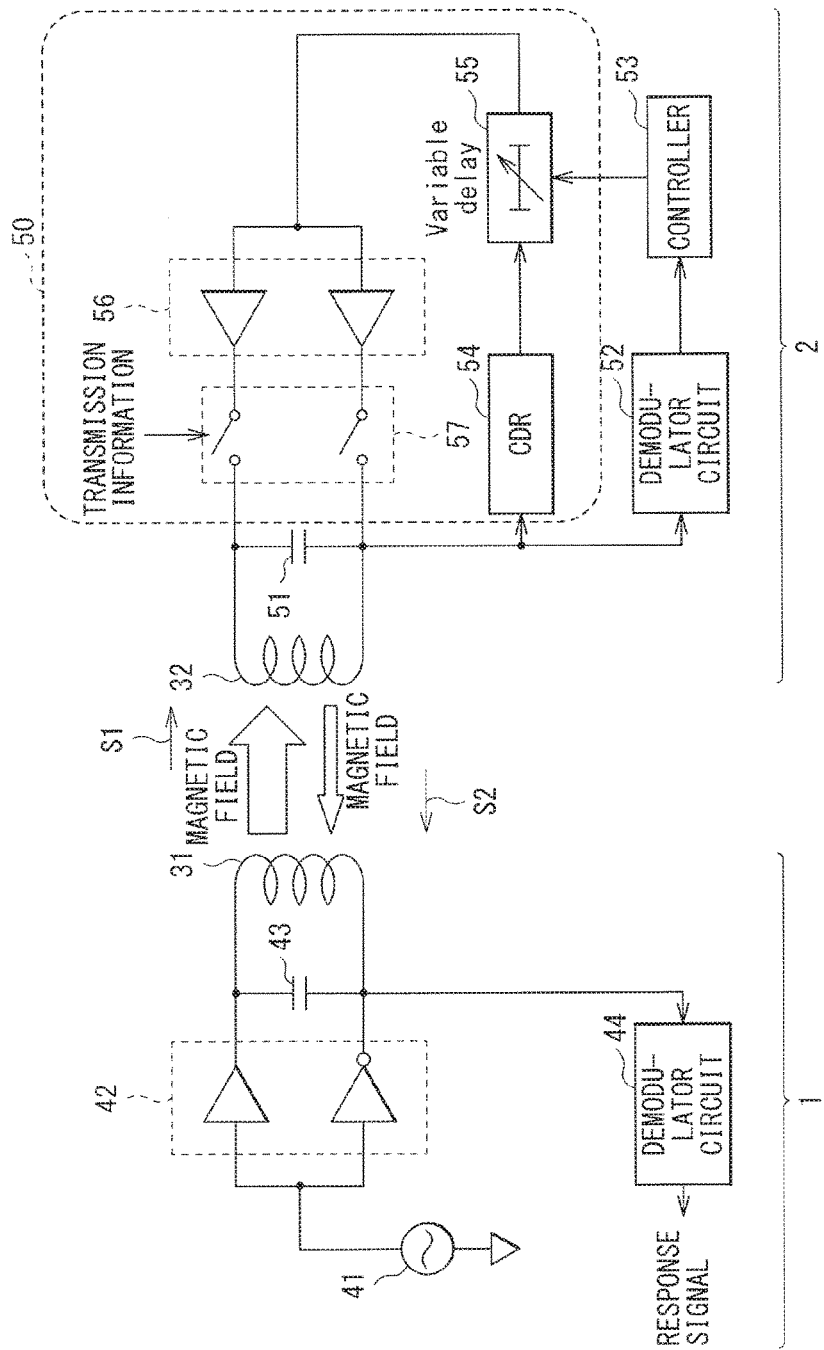

[ FIG. 8 ]
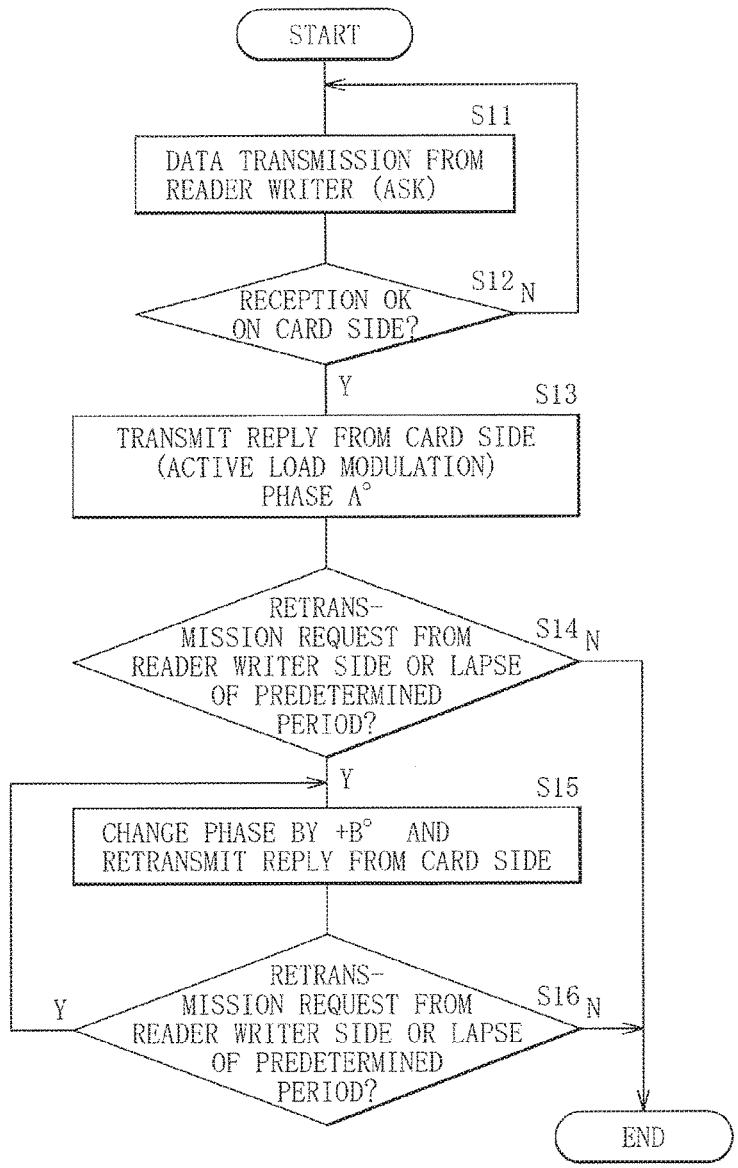

[ FIG. 9 ]

| CARRIER SIGNAL AMPLITUDE | ACTIVE LOAD MODULATION SIGNAL AMPLITUDE | ACTIVE LOAD MODULATION SIGNAL PHASE | COMPOSITE SIGNAL AMPLITUDE | MODULATION LEVEL |
|---|---|---|---|---|
| 5 (V) | 0.1 (V) | 0 (°) | 5.1 (V) | 0.1 (V) |
| 5 | 0.1 | 30 | 5.086848278 | 0.0086848 |
| 5 | 0.1 | 60 | 5.05074252 | 0.050743 |
| 5 | 0.1 | 90 | 5.0009999 | 0.001 |
| 5 | 0.1 | 120 | 4.950757518 | -0.04924 |
| 5 | 0.1 | 150 | 4.913651859 | -0.08635 |
| 5 | 0.1 | 180 | 4.9 | -0.1 |
| 5 | 0.1 | 210 | 4.913651859 | -0.08635 |
| 5 | 0.1 | 240 | 4.950757518 | -0.04924 |
| 5 | 0.1 | 270 | 5.0009999 | 0.001 |
| 5 | 0.1 | 300 | 5.05074252 | 0.050743 |
| 5 | 0.1 | 330 | 5.086848278 | 0.0086848 |
| 5 | 0.1 | 360 | 5.1 | 0.1 |

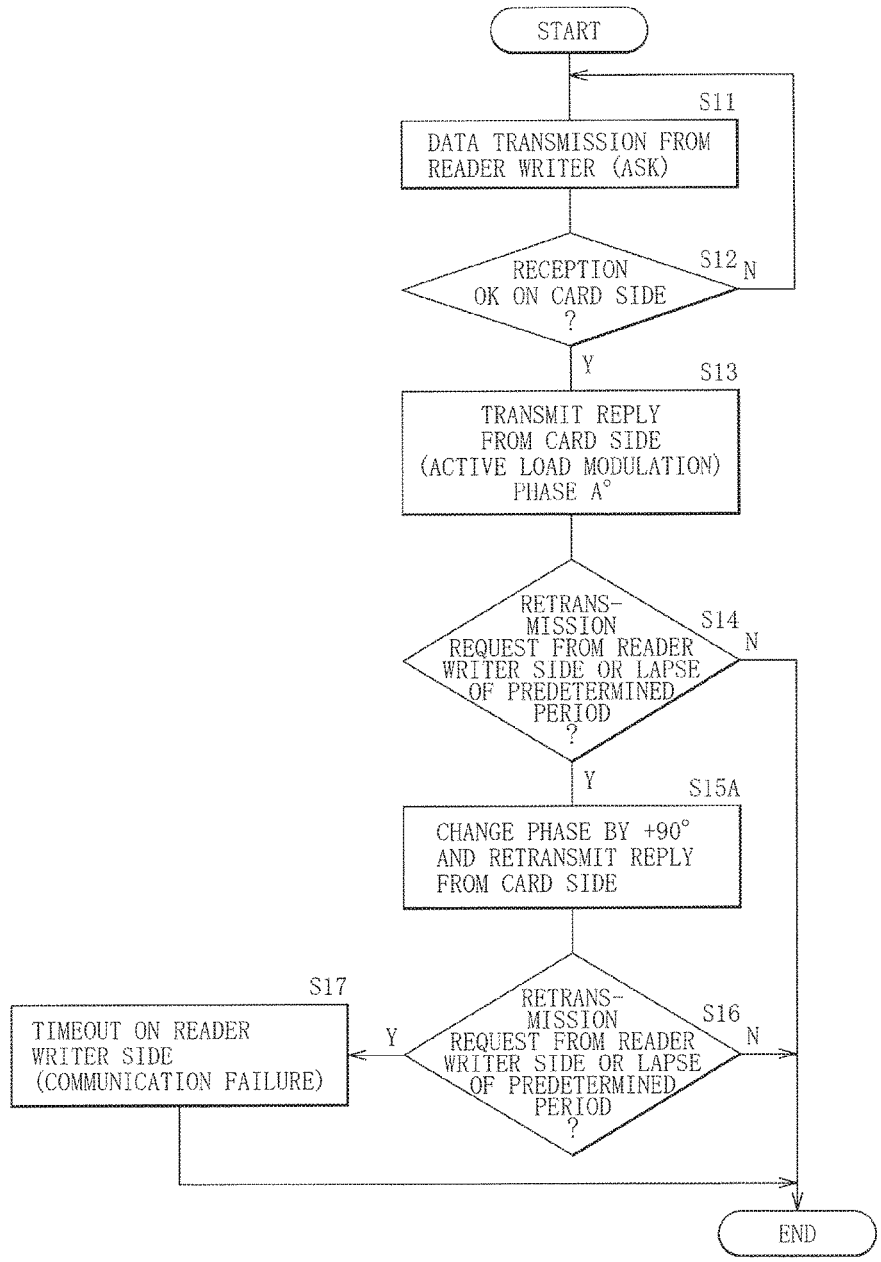
[ FIG. 10 ]

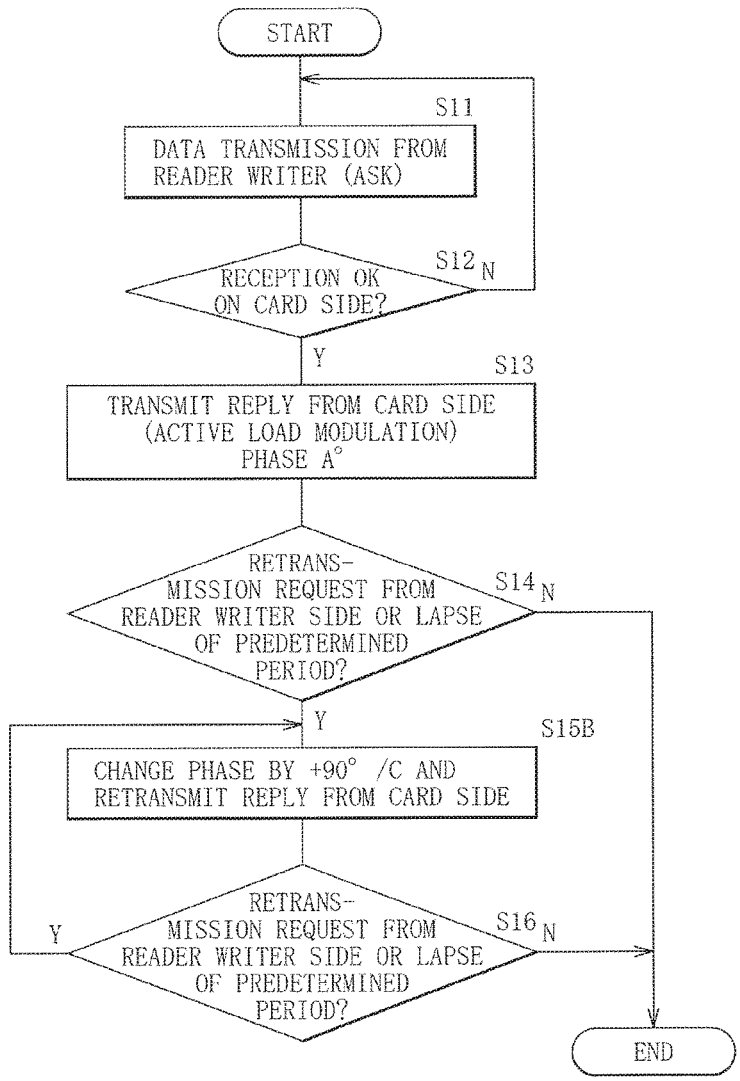
[FIG. 11]

[ FIG. 12 ]
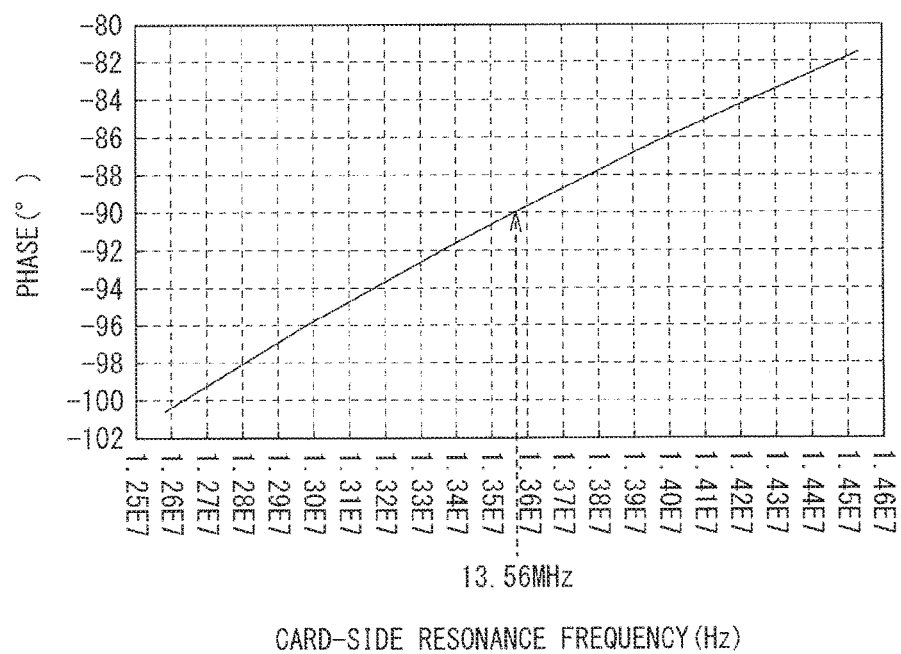

[ FIG. 13 ]
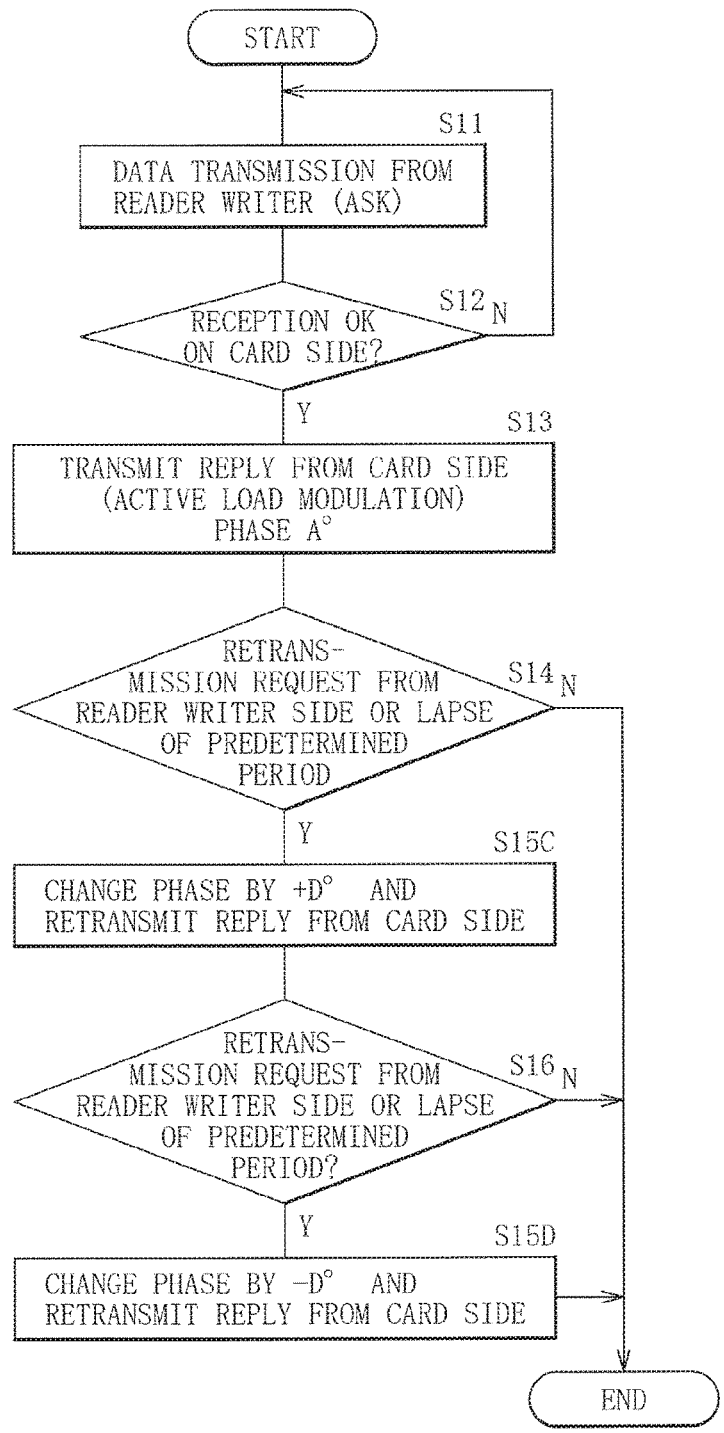

[ FIG. 14 ]
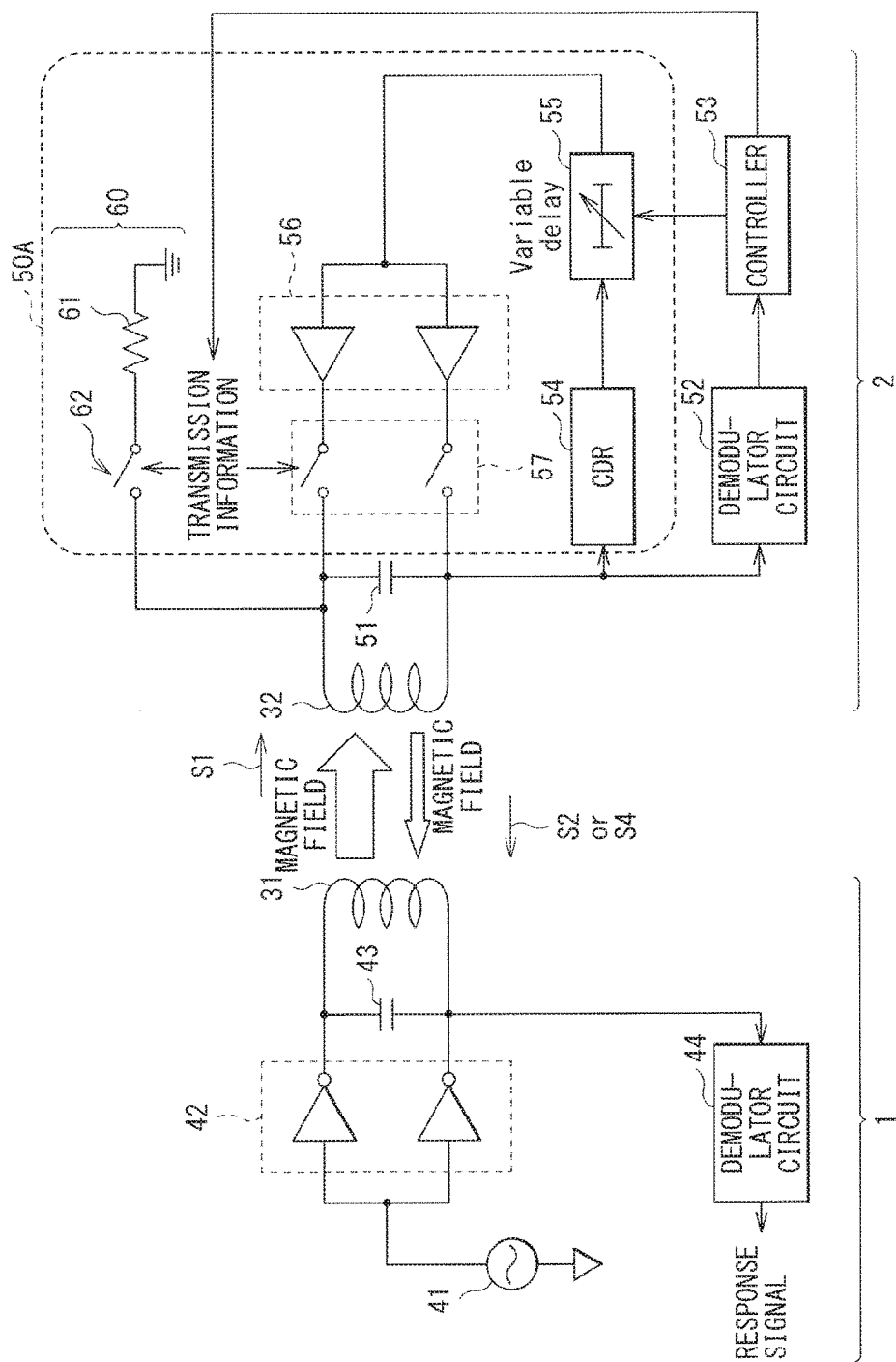

[ FIG. 15 ]
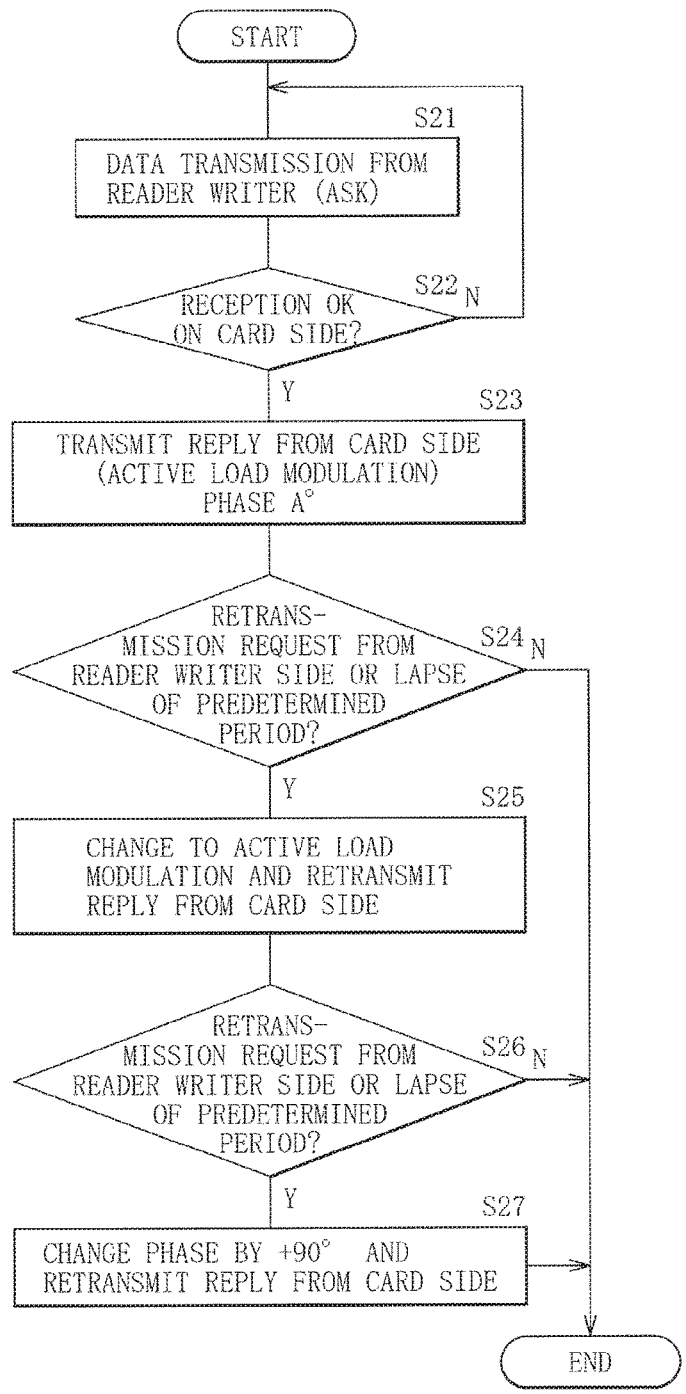

RECEIVER AND COMMUNICATION SYSTEM

TECHNICAL FIELD

The disclosure relates to a receiver and a communication system that perform communication using load modulation.

BACKGROUND ART

A communication system using radio frequency identification (RFID), i.e., an RFID system, is known as a wireless communication technology. This communication system performs, for example, a communication system between a contactless IC card and a reader writer. In this communication system, it is possible to classify communications into two types depending on a communication direction, i.e., communication from the reader writer to the card and communication from the card to the reader writer. In both communication directions, the reader writer constantly oscillates a carrier frequency, and the card performs transmission processing (response processing) as well as receiving processing, on the basis of electric power obtained from this carrier frequency.

In addition, near field communication (NFC) is known as a communication standard of wireless communication. The NFC is a near-field wireless communication technology approved as an international standard, and has been spreading mainly in Asian countries for fields such as a traffic system, charging, and authorization. In recent years, in particular, application to, for example, smartphones and wearable devices has been expected, and downsizing of components to realize functions has been expected. Among components, an antenna is a component that occupies a large area, and technologies that realize downsizing of the antenna have been receiving attention.

CITATION LIST

Patent Literature

PTL 1: Japanese Unexamined Patent Application Publication No. 2013-62605
PTL 2: Japanese Unexamined Patent Application Publication No. 2011-254156

SUMMARY OF THE INVENTION

In the communication based on the NFC, a magnetic field is utilized, and amplitude shift keying (ASK) modulation is used for communications from reader writer side to card side, whereas load modulation is used for communications from the card side to the reader writer side (see PTL 1 and PTL 2). Passive load modulation is known as a scheme of the load modulation. The passive load modulation is such a technique that, when a response is transmitted from the card side, a change in impedance viewed from the reader writer side is caused by turning on/off an internal load, and modulation is confirmed by reading the change on the reader writer side.

However, in the passive load modulation, it is difficult to downsize an antenna. In the passive load modulation, a magnetic field between an antenna of the reader writer and an antenna of the card is changed by changing a load. However, for example, if a communication range is long or an antenna is small, a coupling coefficient is small, so that a change in magnetic field caused by changing a load is small. For this reason, a certain or higher level of coupling coefficient is necessary, and in a case where a certain or larger length of communication range (e.g., about 50 mm to about 100 mm) is necessary as in a traffic system, an antenna is limited to a certain or larger size. In reality, a communication-possible range of the NFC is rate-controlled using the passive load modulation in great many cases. In other words, there are many cases where communications from the reader writer side to the card side are successful, but load modulation communications from the card side to the reader writer side are unsuccessful.

Most of measures for the load modulation are to improve performance by making efforts on the receiving side, as represented by a technique described in PTL 1. The technique described in PTL 1 is to improve performance by lowering an amplifier gain when a load modulation level is high. This is not a technique of improving load modulation intensity itself. It is necessary to devise a way itself of applying load modulation, in order to improve communication performance by making efforts on the card side for an already-existing reader writer.

It is therefore desirable to provide a receiver and a communication system that allow communication properties to improve.

A receiver according to one embodiment of the disclosure includes a load modulator that transmits an active load modulation signal generated by active load modulation to a reader writer, in response to a carrier signal transmitted from the reader writer, and a controller that determines whether the active load modulation signal has reached the reader writer, and controls the load modulator to retransmit the active load modulation signal, after changing a phase of the active load modulation signal with respect to the carrier signal, in a case where the controller determines that the active load modulation signal has not reached the reader writer.

A communication system according to one embodiment of the disclosure includes a reader writer that transmits a carrier signal, and a receiver that transmits a modulation signal to the reader writer, in response to the carrier signal, in which the receiver includes a load modulator that transmits an active load modulation signal generated by active load modulation to the reader writer, in response to the carrier signal transmitted from the reader writer, and a controller that controls the load modulator to retransmit the active load modulation signal, after changing a phase of the active load modulation signal with respect to the carrier signal, in a case where determination is made that the active load modulation signal has not reached the reader writer.

In the receiver or the communication system according to the embodiment of the disclosure, the phase of the active load modulation signal with respect to the carrier signal is changed and the active load modulation signal is retransmitted, in a case where it is determined that the active load modulation signal has not reached the reader writer.

According to the receiver or the communication system of the embodiment of the disclosure, the phase of the active load modulation signal with respect to the carrier signal is changed and the active load modulation signal is retransmitted, in a case where it is determined that the active load modulation signal has not reached the reader writer. It is therefore possible to improve communication properties.

It is to be noted that the effects described above are not necessarily limitative, and any of effects described in the disclosure may be provided.

BRIEF DESCRIPTION OF THE DRAWINGS

FIG. 1 is an explanatory diagram schematically illustrating a concept of signal transmission from a reader writer to a card, in a communication system using passive load modulation.

FIG. 2 is an explanatory diagram schematically illustrating a concept of signal transmission from the card to the reader writer, in the communication system using the passive load modulation.

FIG. 3 is an explanatory diagram schematically illustrating a concept of a communication system using active load modulation.

FIG. 4 is an explanatory diagram schematically illustrating a concept of signal transmission from a reader writer to a card, in the communication system using the active load modulation.

FIG. 5 is an explanatory diagram schematically illustrating a concept of signal transmission from the card to the reader writer, in the communication system using the active load modulation.

FIG. 6 is an explanatory diagram schematically illustrating a concept of a phase relation in a resonance circuit.

FIG. 7 is a circuit diagram illustrating a configuration example of a communication system according to a first embodiment of the disclosure.

FIG. 8 is a flowchart illustrating an example of a communication operation of the communication system according to the first embodiment.

FIG. 9 is an explanatory diagram illustrating an example of a relationship between a phase difference between a carrier signal and an active load modulation signal, and a modulation level.

FIG. 10 is a flowchart illustrating a specific example of the communication operation illustrated in FIG. 8.

FIG. 11 is a flowchart illustrating an example of a communication operation of a communication system according to a second embodiment.

FIG. 12 is an explanatory diagram illustrating an example of a relationship between a card-side resonance frequency and a phase.

FIG. 13 is a flowchart illustrating an example of a communication operation of a communication system according to a third embodiment.

FIG. 14 is a circuit diagram illustrating a configuration example of a communication system according to a fourth embodiment.

FIG. 15 is a flowchart illustrating an example of a communication operation of a communication system according to a fourth embodiment.

MODES FOR CARRYING OUT THE INVENTION

Some embodiments of the disclosure will be described below in detail with reference to the drawings. It is to be noted that the description will be provided in the following order.
0. Outline and Issue of Communication System Using Load Modulation (FIG. 1 to FIG. 6)
1. First Embodiment (FIG. 7 to FIG. 10)
   1.1 Configuration
   1.2 Operation
   1.3 Effects
2. Second Embodiment (FIG. 11 and FIG. 12)
3. Third Embodiment (FIG. 13)
4. Fourth Embodiment (FIG. 14 and FIG. 15)
5. Other Embodiments

0. Outline and Issue of Communication System Using Load Modulation

First, an outline and an issue of a communication system that uses load modulation and is to be applied to communications such as the NFC will be described.

An outline of a communication system using passive load modulation will be described first with reference to FIG. 1 and FIG. 2. In this communication system, interactive communications are performed between a reader writer 10 and a transponder serving as a receiver. The transponder is a card 20 such as a contactless IC card. FIG. 1 schematically illustrates a concept of signal transmission from the reader writer 10 to the card 20. FIG. 2 schematically illustrates a concept of signal transmission from the card 20 to the reader writer 10.

The reader writer 10 has a detection circuit 11, a transmission information generator 12, a carrier signal generator 13, a modulator 14, a transmission amplifier 15, a resistance 16, a capacitor 17, and an antenna coil 18.

The card 20 has a detection circuit 21, an antenna coil 22, a capacitor 23, a resistance 24, a load modulator 25, and a transmission information generator 26.

The carrier signal generator 13 generates, for example, a carrier signal of a carrier frequency of 13.56 MHz. The antenna coil 18 and the antenna coil 22 configure a pair of transformers. Between the card 20 and the reader writer 10, wireless communication is performed on the basis of magnetic coupling of a coupling coefficient k between the antenna coil 18 and the antenna coil 22.

Processing of data transmission from the reader writer 10 to the card 20 will be described with reference to FIG. 1. Using the modulator 14, the reader writer 10 generates a modulation signal (a signal S1c) in which transmission information (a signal S1b) of 212 kbps is superimposed on a carrier signal (a signal S1a) of 13.56 MHz, as illustrated in FIG. 1. A scheme of ASK modulation is used as a modulation scheme. The modulation signal outputted from the modulator 14 is transmitted to the card 20, through the transmission amplifier 15, the resistance 16, the capacitor 17, and the antenna coil 18. The card 20 receives a signal S1d from the reader writer 10, through the antenna coil 22, the capacitor 23, and the resistance 24.

Processing of data transmission from the card 20 to the reader writer 10 will be described with reference to FIG. 2. The reader writer 10 transmits a carrier signal (a signal S2a) of 13.56 MHz to the card 20, through the transmission amplifier 15, the resistance 16, the capacitor 17, and the antenna coil 18, as illustrated in FIG. 2. In response to the carrier signal, the card 20 transmits a transmission signal (a signal S2c), which is generated by modulating transmission information (a signal S2b) of 212 kbps with the load modulator 25, to the reader writer 10, through the resistance 24, the capacitor 23, and the antenna coil 22. The reader writer 10 receives a signal S2d from the card 20, through the antenna coil 18 coil.

In the communication from the card 20 to the reader writer 10, the passive load modulation is used. In the passive load modulation, a diamagnetic field is generated by turning on/off a load in the load modulator 2. It is possible to confirm modulation by reading (detecting) the change with the reader writer 10.

In view of an issue such as difficulty of downsizing an antenna in the passive load modulation, communication technology using active load modulation has been receiving attention in recent years.

FIG. 3 schematically illustrates a concept of a communication system using the active load modulation.

In this communication system, interactive communication is performed between a reader writer 100 and a card 200 such as a contactless IC card serving as a receiver.

The reader writer 100 includes a transmission system 101 and a receiving system 102. The transmission system 101 has an antenna coil 111 and a carrier signal generator 112. The receiving system 102 has the antenna coil 111.

The card 200 has an antenna coil 211, a capacitor 212, and a load modulator 213 including a transmission information generator 214.

In the reader writer 100, the carrier signal generator 112 generates, for example, a carrier signal S1 of a carrier frequency of 13.56 MHz. The antenna coil 111 and the antenna coil 211 configure a pair of transformers. Between the card 200 and the reader writer 100, wireless communication is performed on the basis of magnetic coupling of a coupling coefficient k between the antenna coil 111 and the antenna coil 211.

Processing of data transmission from the card 200 to the reader writer 100 in FIG. 3 will be described. The reader writer 100 transmits the carrier signal S1 of 13.56 MHz to the card 200 through the antenna coil 111. In response to the carrier signal S1, the card 200 transmits a transmission signal generated by modulating transmission information with the load modulator 213, to the reader writer 100, through the capacitor 212 and the antenna coil 211. The reader writer 100 receives the transmission signal from the reader writer 100 through the antenna coil 111.

In the communication from the card 200 to the reader writer 100, the active load modulation is used. In the active load modulation, a certain load (resistance) is not tuned on/off, unlike the passive load modulation. In the active load modulation, a magnetic flux in a certain period is changed by returning an active load modulation signal S2, which is synchronized with the carrier signal S1 from the reader writer 100 and is of the same frequency as a frequency of the carrier signal S1, to the reader writer 100 side. For example, the active load modulation signal S2 is returned in an ON period in a clock signal CLK synchronized with the carrier signal S1. As compared with the passive load modulation, there is such a characteristic that it is possible to greatly change a magnetic flux between the antenna coil 211 and the antenna coil 111, because a current is directly fed through the antenna coil 211. It is therefore possible to achieve communication performance that is superior to that of the passive load modulation. In other words, it may be possible to keep communication performance equal to that of the passive load modulation, even if the antenna coil 211 and the antenna coil 111 are downsized.

However, the active load modulation has a significant issue. FIG. 4 schematically illustrates a concept of signal transmission from the reader writer 100 to the card 200. The transmission of the carrier signal S1 from the reader writer 100 to the card 200 is performed on the basis of the ASK modulation. Meanwhile, FIG. 5 schematically illustrates a concept of signal transmission from the card 200 to the reader writer 100. The transmission of the active load modulation signal S2 from the card 200 to the reader writer 100 is performed on the basis of the active load modulation. In the active load modulation, a composite signal S3 of the carrier signal S1 and the active load modulation signal S2 is generated. In the active load modulation, there is such a mechanism that modulation is caused by a change in amplitude of the composite signal S3 on the basis of a theorem of sinusoidal synthesis. For this reason, a modulation degree greatly changes depending on a phase difference between the carrier signal S1 and the active load modulation signal S2. The theorem of sinusoidal synthesis is expressed by Expression (1) as follows.

[Expression 1]

$$A\sin(\omega t) + B\sin(\omega t + \theta) = \sqrt{A^2 + B^2 + 2AB\cos\theta}\sin(\theta + \phi) \quad (1)$$

From Expression (1), A is an amplitude of the transmission signal (the carrier signal S1) of the reader writer 100, B is an amplitude of the active load modulation signal S2, and θ is a phase of the active load modulation signal S2 based on a transmission signal of the reader writer 100 as a reference. In other words, a case where Expression (2) is established as follows means that no change occurs in amplitude at all even if the active load modulation signal S2 is combined, that is, no modulation appears in the amplitude at all.

[Expression 2]

$$\sqrt{A^2 + B^2 + 2AB\cos\theta} = A \quad (2)$$

If this is simplified, it is possible to say that amplitude NULL is generated on a condition of Expression (3) as follows.

$$\cos\theta = -B/2A \quad (3)$$

As apparent from this, in the active load modulation, the modulation degree greatly changes depending on a phase relation.

Here, FIG. 5 illustrates a mechanism of a phase relation in a resonance circuit 300 formed of the antenna coils 111 and 211 and having the coupling coefficient k. In FIG. 5, a transmission signal (the carrier signal S1) from the reader writer 100 is assumed to be a signal A, and the carrier signal S1 having passed through the resonance circuit 300 is assumed to be a signal A'. In addition, the active load modulation signal S2 from the card 200 is assumed to be a signal B, and the composite signal S3 having passed through the resonance circuit 300 is assumed to be a signal B'.

The signal A' having passed through the resonance circuit 300 from the reader writer 100 has a phase leading (or lagging) by X°. On the card 200 side, the active load modulation signal S2 is generated based on a phase leading by X° as a reference, when a phase lead (lag) of the resonance circuit 300 is X°. In this case, at a stage where the composite signal S3 is generated by signal composition on the reader writer 100 side following the resonance circuit 300, the phase is assumed to lead by 2×X° for the original carrier signal S1. If this phase shift X is fixed, it is possible to make an adjustment on the card 200 side to select a phase in which modulation is constantly larger than Expression (2). For example, a phase X is 90° in an ideal parallel resonance circuit in which a signal frequency and a resonance frequency match with each other.

However, in the communication system based on the NFC, the resonance circuit 300 is not an ideal parallel resonance circuit. The coupling coefficient k changes due to a positional relationship between the reader writer 100 and the card 200, and the respective resonance frequencies also change because of manufacturing variation or housing metal influence when they face each other. For example, in a simulation using a simple parallel resonance model, a phase lag is approximately 90° when the coupling coefficient k is 0.01, whereas the phase lag is 53° when the coupling coefficient k is 0.5. In addition, a phase shift of ±10° occurs when a receiving-side (card-side) resonance frequency is shifted by ±1 MHz. When the resonance frequency is shifted by ±1 MHz on a transmission or receiving side, the phase shift may be ±20%, that is, a large change width of 40% in width. In this case, some of reader writers 100 may be allowed to deal with this situation by using a fixed phase. However, there are many reader writers 100 in the world, and if there is a special reader writer 100 that intentionally shifts a resonance frequency, desired communication properties may not be obtained due to an inappropriate phase relation based on the fixed phase.

1. First Embodiment

[1.1 Configuration]

FIG. 7 illustrates a configuration example of a communication system according to a first embodiment of the disclosure.

The communication system according to the present embodiment includes a reader writer 1 that transmits a carrier signal S1, and a receiver that transmits a modulation signal to the reader writer 1 in response to the carrier signal S1. The receiver may be a card 2 such as a contactless IC card.

The reader writer 1 has an antenna coil 31, a carrier signal generator 41, an amplifier section 42, a capacitor 43, and a demodulator circuit 44.

The card 2 has an antenna coil 32, a load modulator 50, a capacitor 51, a demodulator circuit 52, and a controller 53. The load modulator 50 has a clock data recovery (CDR) circuit 54, a phase regulator 55, an amplifier section 56, and a switching section 57.

In the reader writer 1, the carrier signal generator 41 is configured to generate, for example, the carrier signal S1 of a carrier frequency of 13.56 MHz. The antenna coil 31 and the antenna coil 32 configure a pair of transformers, and form a resonance circuit 300 having a configuration substantially similar to that illustrated in FIG. 6. Between the card 200 and the reader writer 100, wireless communication is performed on the basis of magnetic coupling of a coupling coefficient k between the antenna coil 31 and the antenna coil 32.

When processing of data transmission from the card 2 to the reader writer 1 is performed in FIG. 7, the reader writer 1 transmits the carrier signal S1 of 13.56 MHz to the card 2, through the amplifier section 42, the capacitor 43, and the antenna coil 31. In response to the carrier signal S1, the card 2 transmits a transmission signal, which is generated by modulating transmission information with the load modulator 50, to the reader writer 1, through the capacitor 51 and the antenna coil 32. The reader writer 1 receives the transmission signal from the reader writer 1 through the antenna coil 31, and demodulates the received transmission signal as a response signal by using the demodulator circuit 44.

The transmission of the carrier signal S1 from the reader writer 1 to the card 2 is performed on the basis of the ASK modulation. In the communication from the card 2 to the reader writer 1, the active load modulation is used. In the load modulator 50, a magnetic flux in a certain period is changed by returning an active load modulation signal S2, which is synchronized with the carrier signal S1 from the reader writer 1 and is of the same frequency as that of the carrier signal S1, to the reader writer 1 side. For example, the active load modulation signal S2 is returned during an ON period in a clock signal CLK synchronized with the carrier signal S1. A principle of the active load modulation is as described above using FIG. 5.

The controller 53 is configured to control the load modulator 50 to retransmit the active load modulation signal S2, after changing a phase of the active load modulation signal S2 for the carrier signal S1 in a case where it is determined that the active load modulation signal S2 has not reached the reader writer 1. For example, the controller 53 is configured to change the phase of the active load modulation signal S2 by a predetermined value, e.g., 90°.

The controller 53 is configured to determine that the active load modulation signal S2 has not reached the reader writer 1, for example, in a case where a retransmission request is received from the reader writer 1, or in a case where no response to the active load modulation signal S2 is provided from the reader writer 1 for a predetermined period.

In the load modulator 50, the CDR circuit 54 is configured to generate the clock signal CLK synchronized with the carrier signal S1. The phase regulator 55 is configured to vary the phase of the active load modulation signal S2, on the basis of control from the controller 53. It is to be noted that the CDR circuit 54 is an example of a circuit for synchronization with the carrier signal S1, but is not limitative. For example, a phase locked loop (PLL) circuit may be adopted. Moreover, for example, the phase regulator 55 may be a variable delay circuit, but may be other circuit without being limited thereto if the circuit is allowed to vary a phase.

[1.2 Operation]

An example of processing operation in a case where data transmission from the card 2 to the reader writer 1 is performed in the communication system according to the present embodiment will be described with reference to FIG. 8.

First, on the basis of the ASK modulation, data transmission of the carrier signal S1 from the reader writer 1 is performed (step S11). The reader writer 1 determines whether the carrier signal S1 is correctly received in the card 2 (step S12). In a case where the reader writer 1 determines that the carrier signal S1 is not correctly received (step S12: N), the reader writer 1 returns to processing of step S11.

In a case where the carrier signal S1 is correctly received on the card 2 side (step S12; N), replying from the card 2 side is performed next on the basis of the active load modulation (step S13). A phase shift of the active load modulation signal S2 with respect to the carrier signal S1 at this moment is assumed to be A°. A phase A° at this moment may be a value adjusted beforehand, or a value based on a monitored value.

Next, the controller 53 determines whether the active load modulation signal S2 has reached the reader writer 1 (step S14). The controller 53 determines that the active load modulation signal S2 has not reached the reader writer 1, for example, in a case where a retransmission request is received from the reader writer 1, or in a case where no response to the active load modulation signal S2 is provided from the reader writer 1 for a predetermined period. In a case where the controller 53 determines that the active load modulation signal S2 has reached the reader writer 1 (step S14: N), the controller 53 ends the processing.

In a case where the controller 53 determines that the active load modulation signal S2 has not reached the reader writer 1 (step S14; Y), the controller 53 controls the load modulator 50 to retransmit the active load modulation signal S2, after further changing the phase of the active load modulation signal S2 with respect to the carrier signal S1 by a predetermined value (+B°) from the above-described phase A°. The active load modulation signal S2, in which the phase is further shifted from the above-described phase A° by a predetermined value (+B°), is retransmitted as a reply from the card 2 side (step S15).

Next, in a manner similar to that in step S14, the controller 53 determines whether the active load modulation signal S2 has reached the reader writer 1 (step S16). In a case where the controller 53 determines that the active load modulation signal S2 has reached the reader writer 1 (step S16; N), the controller 53 ends the processing. In a case where the controller 53 determines that the active load modulation signal S2 has not reached the reader writer 1 (step S16; Y), the controller 53 returns to processing of step S15.

Here, a specific numerical value of a phase shift will be described.

FIG. 9 illustrates an example of a relationship between a phase of the active load modulation signal S2 with respect to the carrier signal S1 and a modulation level. As specific numerical values, FIG. 9 illustrates an amplitude (V) of each of the carrier signal S1 and the active load modulation signal S2, a phase (°) of the active load modulation signal S2, an amplitude (V) of the composite signal S3 of the carrier signal S1 and the active load modulation signal S2, and a modulation level (V) of the composite signal S3.

In FIG. 9, a long distance for which the active load modulation is necessary (a case where a distance between the reader writer 1 and the card 2 is long) is assumed, and therefore, the amplitude of the composite signal S3 is assumed to be considerably larger than the amplitude of the active load modulation signal S2. In such a case, the modulation level is small when the phase of the active load modulation signal S2 is any of 90° and 270°, as illustrated in FIG. 9. In addition, it is appreciated that the modulation level is brought at a maximum or minimum every 90° of the phase. This is also apparent from Expression (3) described above.

FIG. 10 illustrates an example of processing operation in a case where the phase of the active load modulation signal S2 is changed on the basis of the above-described numerical examples in FIG. 9, in a case where data transmission from the card 2 to the reader writer 1 is performed.

In FIG. 10, processing from step S11 to step S14 is similar to that in FIG. 8 described above. In the processing operation in FIG. 10, processing of step S15A is performed in place of step S15 in FIG. 8. In step S15A, the controller 53 controls the load modulator 50 to retransmit the active load modulation signal S2 after changing the phase of the active load modulation signal S2 with respect to the carrier signal S1 further by +90° as a predetermined value from the above-described phase A°. The active load modulation signal S2 in which the phase is shifted from the above-described phase A° further by +90° is thereby retransmitted as a reply from the card 2 side.

Next, in a manner similar to that in step S14, the controller 53 determines whether the active load modulation signal S2 has reached the reader writer 1 (step S16). In a case where the controller 53 determines that the active load modulation signal S2 has reached the reader writer 1 (step S16; N), the controller 53 ends the processing. In a case where the controller 53 determines that the active load modulation signal S2 has not reached the reader writer 1 (step S16; Y), a timeout occurs on the reader writer 1 side, and communication is assumed to be a failure (step S17), which ends the processing.

In a case where it is assumed that it is possible to change the phase on the card 2 side temporally only once, in view of a relationship with the time of the timeout on the reader writer 1 side, the phase may be changed by +90° on the basis of the relationship of the values illustrated in FIG. 9. This makes it possible to evade a worst case such as the amplitude NULL.

[1.3 Effects]

As described above, according to the present embodiment, the phase of the active load modulation signal S2 with respect to the carrier signal S1 is changed and retransmitted in a case where it is determined that the active load modulation signal S2 has not reached the reader writer 1, and it is therefore possible to improve communication properties.

It is to be noted that the effects described herein are mere examples without being limitative, and other effects may also be provided. This holds true for other embodiments to be described below.

2. Second Embodiment

Next, a second embodiment of the disclosure will be described. In the following, for a part having a configuration and a working similar to those in the above-described first embodiment, description will be omitted as appropriate.

A basic configuration of a communication system in the present embodiment may be substantially similar to that in FIG. 7. In the present embodiment, the controller 53 controls the load modulator 50 to change the phase of the active load modulation signal S2 by a predetermined step a plurality of times, until the active load modulation signal S2 is determined to have reached the reader writer 1.

An example of a processing operation in a case where data transmission from the card 2 to the reader writer 1 is performed in the communication system according to the present embodiment will be described with reference to FIG. 11.

In FIG. 11, processing from step S11 to step S14 is similar to that in FIG. 8 described above. In the processing operation in FIG. 11, processing in step S15B is performed in place of step S15 in FIG. 8. In step S15B, after the phase of the active load modulation signal S2 with respect to the carrier signal S1 is changed from the above-described phase A° further by a predetermined step (+90°/C) used as the predetermined value (C is the predetermined number of divisions), the active load modulation signal S2 is retransmitted. The active load modulation signal S2 in which the phase is shifted further by the predetermined step (+90°/C) from the above-described phase A° is thereby retransmitted as a reply from the card 2 side. Afterward, processing similar to that in step S16 in FIG. 8 is performed.

In a case where there is enough time to change the phase of the active load modulation signal S2 a plurality of times on the card 2 side, it is efficient to vary the phase by a predetermined step to change the phase eventually by 90° at maximum, instead of varying the phase by +90° once as in the processing of step S15A in FIG. 10. For example, in a case where it is possible to change the phase three times (in a case of C=3), the phase may be changed by 30° each time.

3. Third Embodiment

Next, a third embodiment of the disclosure will be described. In the following, for a part having a configuration and a working similar to those in the above-described first or second embodiment, description will be omitted as appropriate.

A basic configuration of a communication system in the present embodiment may be substantially similar to that in FIG. 7. In the present embodiment, in a case where it is determined that the active load modulation signal S2 has not reached the reader writer 1 after the phase of the active load modulation signal S2 is changed by a predetermined value in a predetermined phase direction, the controller 53 controls the load modulator 50 to change the phase of the active load modulation signal S2 further by a predetermined value in a direction opposite to the predetermined phase direction.

An example of a processing operation in a case where data transmission from the card 2 to the reader writer 1 is performed in the communication system according to the present embodiment will be described with reference to FIG. 13.

In FIG. 13, processing from step S11 to step S14 is similar to that in FIG. 8 described above. In the processing operation in FIG. 13, processing in step S15C is performed in place of step S15 in FIG. 8. In step S15C, after the phase of the load modulation signal S2 with respect to the carrier signal S1 is changed from the above-described phase A° further by a predetermined value (D°) in a predetermined phase direction (a plus direction), the active load modulation signal S2 is retransmitted. The active load modulation signal S2 in which the phase is shifted further by +D° from the above-described phase A° is thereby retransmitted as a reply from the card 2 side. Afterward, processing similar to that in step S16 in FIG. 8 is performed.

In a case where the controller 53 determines that the active load modulation signal S2 has reached the reader writer 1 (step S16; N), the controller 53 ends the processing. In a case where the controller 53 determines that the active load modulation signal S2 has not reached the reader writer 1 (step S16; Y), the active load modulation signal S2 is retransmitted after the phase of the active load modulation signal S2 with respect to the carrier signal S1 is changed from the above-described phase A° further by the predetermined value (D°) in a direction (a minus direction) opposite to the predetermined phase direction. The active load modulation signal S2 in which the phase is shifted further by −D° from the above-described phase A° is thereby retransmitted as a reply from the card 2 side (step S15D). Afterward, the processing ends.

FIG. 12 illustrates an example of a relationship between a resonance frequency on the card 2 side and a phase. It is apparent from FIG. 12 that the resonance frequency on the card 2 side changes in reverse from 13.56 MHz as the center. The resonance frequency changes depending on variations in components of a communication system. In general, the variations in components of a communication system occur in both of plus and minus directions. For this reason, whether a change of the phase is, for example, 80° or 100° depends on variations in the resonance frequency. It is difficult to detect in which direction the resonance frequency has changed, during communication based on the NFC. Hence, communication performance may be improved by changing the phase in the plus direction and the minus direction as in the above-described operation in FIG. 13.

4. Fourth Embodiment

Next, a fourth embodiment of the disclosure will be described. In the following, for a part having a configuration and a working similar to those in the above-described first to third embodiments, description will be omitted as appropriate.

FIG. 14 illustrates a configuration example of a communication system according to the fourth embodiment of the disclosure.

In the communication system of the present embodiment, the card 2 has a load modulator 50A, instead of having the load modulator 50 in FIG. 7.

In the present embodiment, the load modulator 50A in the card 2 further includes a passive load modulator 60 that transmits a passive load modulation signal S4 based on the passive load modulation, in response to the carrier signal S1. The passive load modulation 60 has a resistance 61 and a switch 62.

The controller 53 determines whether the passive load modulation signal S4 has reached the reader writer 1. In a case where the controller 53 determines that the passive load modulation signal S4 has not reached the reader writer 1, the controller 53 controls the load modulator 50A to reply based on the active load modulation signal S2.

Other configurations may be substantially similar to those in FIG. 7.

An example of a processing operation in a case where data transmission from the card 2 to the reader writer 1 is performed in the communication system according to the present embodiment will be described with reference to FIG. 15.

First, on the basis of the ASK modulation, data transmission of the carrier signal S1 from the reader writer 1 is performed (step S21). The reader writer 1 determines whether the carrier signal S1 is correctly received in the card 2 (step S22). In a case where the reader writer 1 determines that the carrier signal S1 is not correctly received (step S22; N), the reader writer 1 returns to processing of step S21.

In a case where the carrier signal S1 is correctly received on the card 2 side (step S22; N), replying from the card 2 side is performed on the basis of the passive load modulation (step S23). A phase shift of the passive load modulation with respect to the carrier signal S1 at this moment is assumed to be A°. A phase A° at this moment may be a value adjusted beforehand, or a value based on a monitored value.

Next, the controller 53 determines whether the passive load modulation signal S4 has reached the reader writer 1 (step S24). The controller 53 determines that the passive load modulation signal S4 has not reached the reader writer 1, for example, in a case where a retransmission request is received from the reader writer 1, or in a case where no response to the passive load modulation signal S4 is provided from the reader writer 1 for a predetermined period. In a case where the controller 53 determines that the passive load modulation signal S4 has reached the reader writer 1 (step S24; N), the controller 53 ends the processing.

In a case where the controller 53 determines that the passive load modulation signal S4 has not reached the reader writer 1 (step S24; Y), next, the controller 53 controls the load modulator 50A to reply based on the active load modulation from the card 2 side (step S25).

Next, the controller 53 determines whether the active load modulation signal S2 has reached the reader writer 1 (step S26). The controller 53 determines that the active load modulation signal S2 has not reached the reader writer 1, for example, in a case where a retransmission request is received from the reader writer 1, or in a case where no response to the active load modulation signal S2 is provided from the reader writer 1 for a predetermined period. In a case where the controller 53 determines that the active load modulation signal S2 has reached the reader writer 1 (step S26; N), the controller 53 ends the processing.

In a case where the controller 53 determines that the active load modulation signal S2 has not reached the reader writer 1 (step S26: Y), the controller 53 controls the load modulator 50 to retransmit the active load modulation signal S2, after changing the phase of the active load modulation signal S2 with respect to the carrier signal S1 further by a predetermined value (+90°) from the above-described phase A°. The active load modulation signal S2 in which the phase is shifted further by the predetermined value (+90°) from the above-described phase A° is thereby retransmitted as a reply from the card 2 side (step S27). Afterward, the processing ends.

It is to be noted that, in the above description, the transmission based on the passive load modulation is performed first, and in a case where the transmission fails, the transmission based on the active load modulation is performed. However, switching may be performed in reverse. In other words, the transmission based on the active load modulation may be performed first, and in a case where the transmission fails, the transmission based on the passive load modulation may be performed.

5. Other Embodiments

It is possible for the technology according to the disclosure to implement various alterations, without being limited to the above-described embodiments.

For example, it is possible for the technology to adopt the following configurations.
(1) A receiver including:
a load modulator that transmits an active load modulation signal generated by active load modulation to a reader writer, in response to a carrier signal transmitted from the reader writer; and
a controller that determines whether the active load modulation signal has reached the reader writer, and controls the load modulator to retransmit the active load modulation signal, after changing a phase of the active load modulation signal with respect to the carrier signal, in a case where the controller determines that the active load modulation signal has not reached the reader writer.
(2) The receiver according to (1), in which the controller changes the phase of the active load modulation signal by a predetermined value.
(3) The receiver according to (1) or (2), in which the predetermined value is 90°.
(4) The receiver according to (1), in which the controller changes the phase of the active load modulation signal by a predetermined step a plurality of times, until the controller determines that the active load modulation signal has reached the reader writer.
(5) The receiver according to (1), in which, in a case where the controller determines that the active load modulation signal has not reached the reader writer, after changing the phase of the active load modulation signal by a predetermined value in a predetermined phase direction, the controller further changes the phase of the active load modulation signal by a predetermined value in a direction opposite to the predetermined phase direction.
(6) The receiver according to any one of (1) to (5), in which, in a case where a retransmission request is received from the reader writer, or in a case where no response to the active load modulation signal is provided from the reader writer for a predetermined period, the controller determines that the active load modulation signal has not reached the reader writer.
(7) The receiver according to any one of (1) to (6), in which the load modulator includes
a passive load modulator that transmits a passive load modulation signal generated by passive load modulation, in response to the carrier signal.
(8) The receiver according to (7), in which the controller determines whether the passive load modulation signal has reached the reader writer, and in a case where the controller determines that the passive load modulation signal has not reached the reader writer, the controller controls the load modulator to reply on the basis of the active load modulation signal.
(9) A communication system including:
a reader writer that transmits a carrier signal: and
a receiver that transmits a modulation signal to the reader writer, in response to the carrier signal, in which
the receiver includes
a load modulator that transmits an active load modulation signal generated by active load modulation to the reader writer, in response to the carrier signal transmitted from the reader writer, and
a controller that controls the load modulator to retransmit the active load modulation signal, after changing a phase of the active load modulation signal with respect to the carrier signal, in a case where determination is made that the active load modulation signal has not reached the reader writer.

The present application is based on and claims priority from Japanese Patent Application No. 2015-024053 filed in the Japan Patent Office on Feb. 10, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A receiver comprising:
a load modulator that transmits an active load modulation signal generated by active load modulation to a reader writer, in response to a carrier signal transmitted from the reader writer; and
a controller that determines whether the active load modulation signal has reached the reader writer, and controls the load modulator to retransmit the active load modulation signal, after changing a phase of the active load modulation signal with respect to the carrier signal, in a case where the controller determines that the active load modulation signal has not reached the reader writer.
2. The receiver according to claim 1, wherein the controller changes the phase of the active load modulation signal by a predetermined value.
3. The receiver according to claim 2, wherein the predetermined value is 90°.
4. The receiver according to claim 1, wherein the controller changes the phase of the active load modulation signal by a predetermined step a plurality of times, until the controller determines that the active load modulation signal has reached the reader writer.
5. The receiver according to claim 1, wherein, in a case where the controller determines that the active load modulation signal has not reached the reader writer, after changing the phase of the active load modulation signal by a predetermined value in a predetermined phase direction, the controller further changes the phase of the active load modulation signal by a predetermined value in a direction opposite to the predetermined phase direction.
6. The receiver according to claim 1, wherein, in a case where a retransmission request is received from the reader writer, or in a case where no response to the active load modulation signal is provided from the reader writer for a predetermined period, the controller determines that the active load modulation signal has not reached the reader writer.

7. The receiver according to claim 1, wherein the load modulator includes
   a passive load modulator that transmits a passive load modulation signal generated by passive load modulation, in response to the carrier signal.

8. The receiver according to claim 7, wherein the controller determines whether the passive load modulation signal has reached the reader writer, and in a case where the controller determines that the passive load modulation signal has not reached the reader writer, the controller controls the load modulator to reply on a basis of the active load modulation signal.

9. A communication system comprising:
   a reader writer that transmits a carrier signal; and
   a receiver that transmits a modulation signal to the reader writer, in response to the carrier signal, wherein
   the receiver includes
      a load modulator that transmits an active load modulation signal generated by active load modulation to the reader writer, in response to the carrier signal transmitted from the reader writer, and
      a controller that controls the load modulator to retransmit the active load modulation signal, after changing a phase of the active load modulation signal with respect to the carrier signal, in a case where determination is made that the active load modulation signal has not reached the reader writer.

\* \* \* \* \*